(12) United States Patent
Röhr

(10) Patent No.: US 9,041,519 B2
(45) Date of Patent: *May 26, 2015

(54) MODEL HELICOPTER ATTITUDE CONTROL AND RECEIVING DEVICE WITH REDUCED SIZE AND SELF-LEARNING FEATURES

(75) Inventor: Ulrich Röhr, Hanau (DE)

(73) Assignees: MIKADO MODEL HELICOPTERS GMBH, Potsdam (DE); Ulrich Röhr, Hanau (DE)

(*) Notice: Subject to any disclaimer, the term of this patent is extended or adjusted under 35 U.S.C. 154(b) by 746 days.

This patent is subject to a terminal disclaimer.

(21) Appl. No.: 13/147,475

(22) PCT Filed: Feb. 2, 2010

(86) PCT No.: PCT/EP2010/000596
§ 371 (c)(1),
(2), (4) Date: Mar. 16, 2012

(87) PCT Pub. No.: WO2010/089072
PCT Pub. Date: Aug. 12, 2010

(65) Prior Publication Data
US 2012/0169484 A1  Jul. 5, 2012

(30) Foreign Application Priority Data
Feb. 4, 2009 (DE) .................. 20 2009 001 355 U

(51) Int. Cl.
*A63H 27/127* (2006.01)
*A63H 27/133* (2006.01)
(Continued)

(52) U.S. Cl.
CPC ............... *A63H 30/04* (2013.01); *A63H 27/12* (2013.01); *G05D 1/0033* (2013.01)

(58) Field of Classification Search
CPC ..... A63H 27/12; A63H 30/04; G05D 1/0033; G05D 1/0858; G05D 1/102

USPC ............... 340/12.5, 13.25; 244/17.11; 446/36
See application file for complete search history.

(56) References Cited

U.S. PATENT DOCUMENTS 5,238,203 A     8/1993   Skonieczny et al.
5,299,759 A *   4/1994   Sherman et al. ........... 244/17.13
(Continued)

FOREIGN PATENT DOCUMENTS

DE      3437297     4/1986
DE      29805401    7/1998
(Continued)

OTHER PUBLICATIONS

ProRC, "Instruction Manual for the Pro RC Flybarless System Rondo", 26 pages, pdf file created Jan. 7, 2009, downloaded from: https://www.commonsenserc.com/RondoInstructionManualEnglish.pdf on May 16, 2014.*

(Continued)

*Primary Examiner* — Benjamin C Lee
*Assistant Examiner* — Stephen Burgdorf
(74) *Attorney, Agent, or Firm* — RatnerPrestia

(57) ABSTRACT

A model aircraft control and receiving device in a housing, comprising an electronic, gyroscopic multi-axis programmable flight attitude controller, having control inputs for a plurality of control channels and inputs for gyroscope signals, wherein the flight attitude controller provides at least one input for a receiver module disposed inside or outside of the housing of the flight attitude controller. The device may be used in a method for controlling and stabilizing a model helicopter, wherein the control comprises a self-learning function and/or the control comprises a coupling of the tail controller to the swashplate controller and/or the control comprises a stopping support function.

15 Claims, 7 Drawing Sheets

(51) Int. Cl.
*A63H 30/04* (2006.01)
*G05D 1/08* (2006.01)
*G08C 19/12* (2006.01)
*H04L 17/02* (2006.01)
*G05D 1/00* (2006.01)
*A63H 27/00* (2006.01)

(56) References Cited

U.S. PATENT DOCUMENTS

| | | | |
|---|---|---|---|
| 5,322,469 A * | 6/1994 | Tilbor | 446/454 |
| 5,597,138 A | 1/1997 | Arlton et al. | |
| 5,749,540 A | 5/1998 | Arlton | |
| 6,053,452 A | 4/2000 | Yamakawa et al. | |
| 6,751,529 B1 | 6/2004 | Fouche | |
| 6,804,511 B1 * | 10/2004 | Kakinuma | 455/420 |
| 8,049,600 B2 * | 11/2011 | Beard et al. | 340/13.27 |
| 2003/0043053 A1 | 3/2003 | Schuckel | |
| 2004/0245378 A1 | 12/2004 | Nonami | |
| 2006/0102777 A1 * | 5/2006 | Rock | 244/17.25 |
| 2006/0264185 A1 | 11/2006 | Jorgensen | |
| 2007/0030174 A1 | 2/2007 | Randazzo et al. | |
| 2007/0032923 A1 | 2/2007 | Mossman et al. | |
| 2007/0093945 A1 | 4/2007 | Grzywna et al. | |
| 2007/0162196 A1 | 7/2007 | Nonami et al. | |
| 2008/0036617 A1 | 2/2008 | Arms et al. | |
| 2008/0097658 A1 | 4/2008 | Shue et al. | |
| 2008/0249672 A1 | 10/2008 | Cherepinsky | |
| 2008/0269988 A1 * | 10/2008 | Feller et al. | 701/41 |
| 2009/0012658 A1 | 1/2009 | Cherepinsky et al. | |
| 2009/0242691 A1 * | 10/2009 | Wittmer | 244/17.13 |
| 2009/0262002 A1 | 10/2009 | Alexander et al. | |
| 2010/0003886 A1 * | 1/2010 | Cheng et al. | 446/37 |
| 2010/0004802 A1 | 1/2010 | Bodin et al. | |
| 2010/0023186 A1 * | 1/2010 | Sahasrabudhe et al. | 701/3 |
| 2010/0210169 A1 | 8/2010 | Rohr | |
| 2012/0169484 A1 | 7/2012 | Rohr | |

FOREIGN PATENT DOCUMENTS

| | | |
|---|---|---|
| DE | 29810356 | 8/1998 |
| GB | 1118117 | 6/1968 |
| WO | WO 96/06006 A1 | 2/1996 |
| WO | WO 2005/100154 A1 | 10/2005 |
| WO | WO 2008/048245 A2 | 4/2008 |

OTHER PUBLICATIONS

MikroKopter Flight—Ctrl V1.0 manual, May 2, 2007, 14 pages, www.MikroKopter.com; English translation, 18 pages, http://www.mikrokopter.de/ucwiki/en/FlightCtrlManual?action=print.

Spektrum DX7/AR7000 mit MK platine interfacen, 12 pages, http://forum.mikrokopter.de/topic-1144.html; Posts dated Jun. 8, 2007-Jan. 16, 2009, and English Translation, "Spectrum DX7/AR7000 with MK board interfacen," 16 pages, http://translate.google.com/translate; retrieved on Feb. 7, 2013.

RC Groups, "Getting PPM output from a Spektrum RX without any PPM stage," Posts dated Jul. 16, 2007-Aug. 22, 2009, 15 pages, http://www.rcgroups.com/forums/showthread.php?t=714299.

Thunder Tiger Europe GmbH, "Elektronische Rotorkopf-Stabilisierung für jedermann!" Thunder Tiger Newsletter Nov. 28, 2008, 1 page and English translation, 1 page.

AC-Helistore, "RONDO V2 Rotorkopf-Stabilisierung, Thunder Tiger," Feb. 10, 2010, 3 pages, and English translation, 1 page.

Adaptive Flight—Unmanned Aerial Vehicle Guidance, Navigation, and Control Systems, 1 page, http://www.adaptiveflight.com/news.html; News reports dated Sep. 2008-Mar. 5, 2009.

Holzapfel, Florian, "Nonlinear Adaptive Control of an Unmanned Aerial Vehicle," Jun. 8, 2004, 282 pages, and English Abstract, 2 pages.

International Search Report for Application No. PCT/EP2010/000596 dated Oct. 21, 2010.

HeliCommand Instruction Manual, Version 1.6, Dec. 2006.

Instruction Manual for the Pro RC Flybarless System, Jan. 2009.

U.S. Office Action for U.S. Appl. No. 12/698,665 mailed Oct. 10, 2012.

U.S. Office Action for U.S. Appl. No. 12/698,665 mailed Feb. 28, 2013.

U.S. Office Action for U.S. Appl. No. 12/698,665 mailed Jun. 17, 2014.

International Search Report for PCT/EP2012/001215 mailed Aug. 8, 2012.

Email from Lawrence A. Baratta, Jr. to Rex A. Donnelly et al., dated Feb. 26, 2015.

Search Report for U.S. Appl. No. 12/698,665, dated Feb. 25, 2015, pp. 1-29.

D. J. Walker, "Multivariable control of the longitudinal and lateral dynamics of a fly-by-wire helicopter," Control Engineering Practice, vol. 1,, Issue 7, pp. 781-795 (Jul. 2003).

Rong Xie, et al., "H∞ State Feedback Control for the Stabilization of the Three Euler Angles of Helicopter Based on LMI," 2008 International Conference on Intelligent Computation Technology and Automation, pp. 375-379 (Oct. 2008).

Castillo, et al., "Small Scale Helicopter Analysis and Controller Design for Non-Aggressive Flights," 2005 IEEE Int'l Conf. On Systems, Man and Cybernetics, vol. 4, pp. 3305-3312 (Oct. 2005).

* cited by examiner

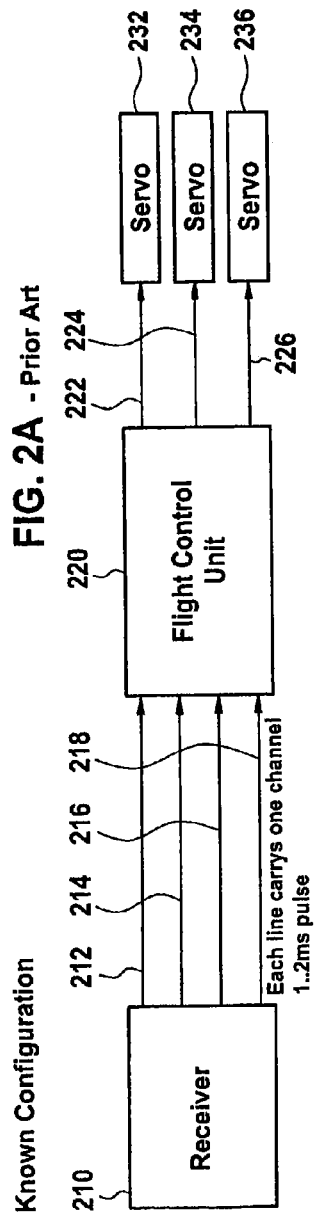
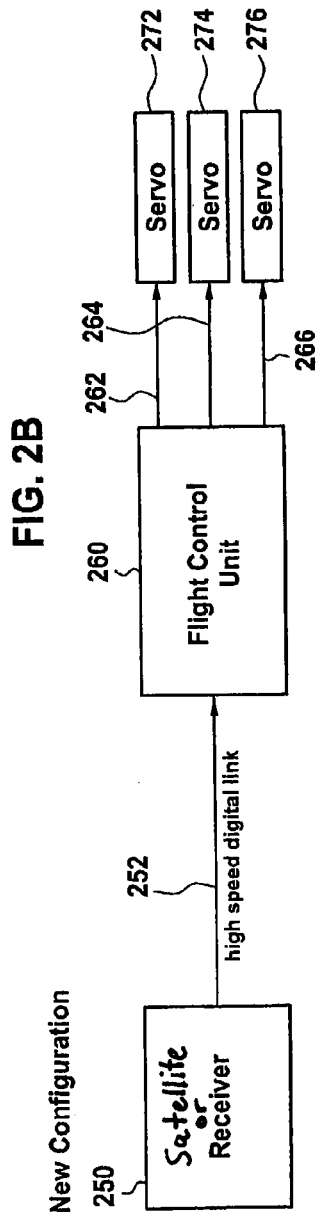
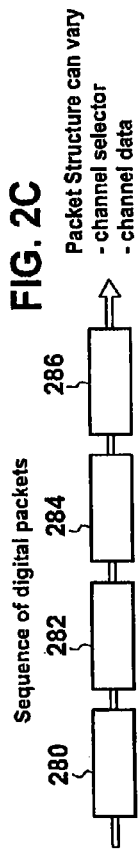

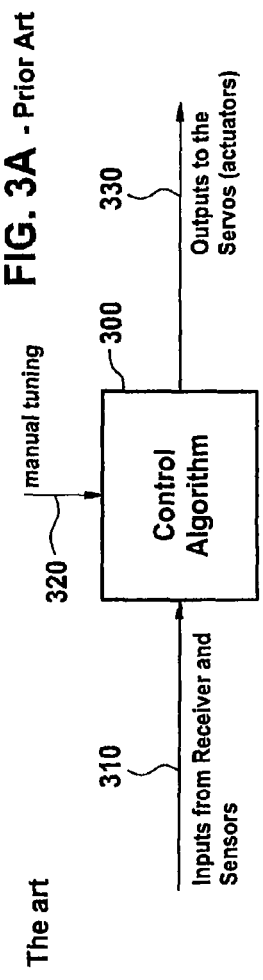
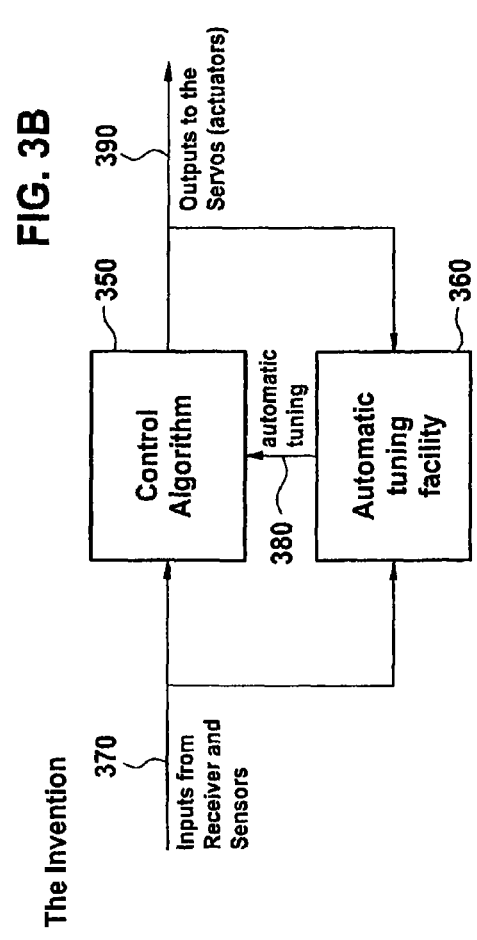

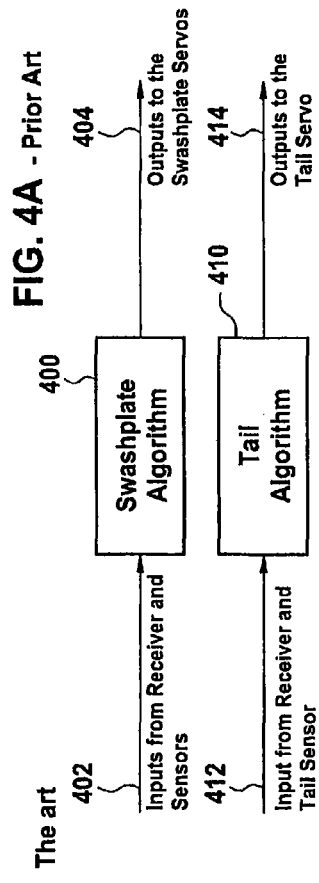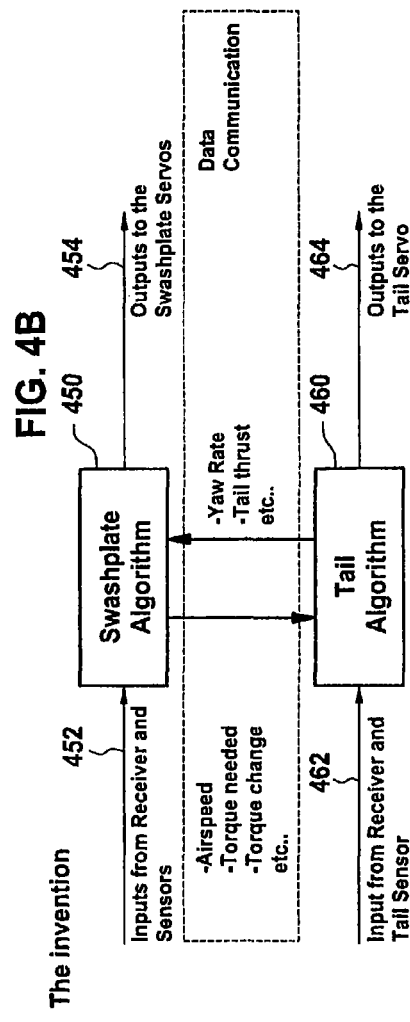

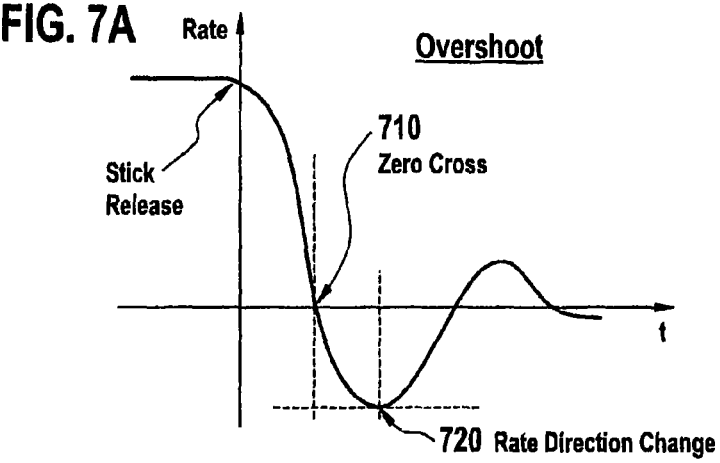
FIG. 7A — Overshoot
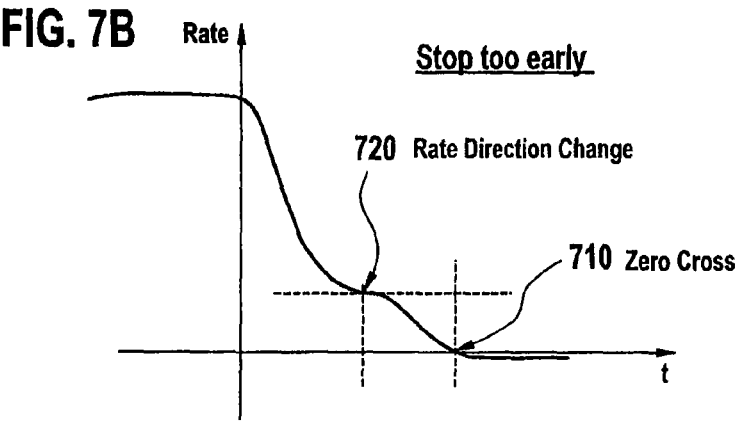
FIG. 7B — Stop too early
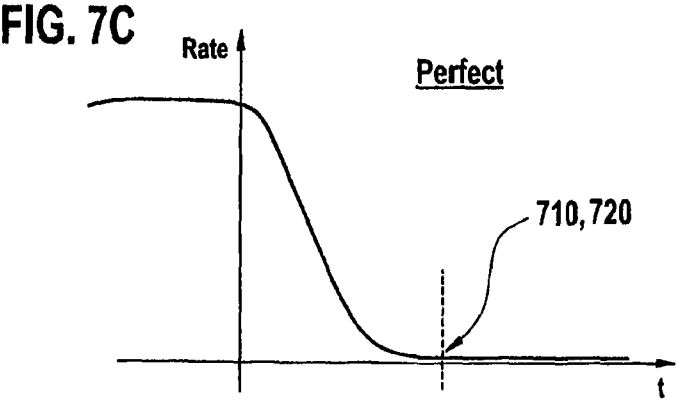
FIG. 7C — Perfect

MODEL HELICOPTER ATTITUDE CONTROL AND RECEIVING DEVICE WITH REDUCED SIZE AND SELF-LEARNING FEATURES

CROSS-REFERENCE TO RELATED APPLICATIONS

This application is the national phase filing of international patent application No. PCT/EP2010/000596, filed 2 Feb. 2010, and claims priority of German patent application number 20 2009 001 355.3, filed 4 Feb. 2009, the entireties of which applications are incorporated herein by reference.

FIELD OF THE INVENTION

The invention relates to a model aircraft control and receiving device.

BACKGROUND OF THE INVENTION

Electronic attitude controllers for stabilizing helicopter flight models are known in the art. An attitude controller for helicopters for the rotor preferably comprises a control means for the attitude control of at least the longitudinal axis (the axis in the direction of flight, that is "roll") and of the transverse axis (the axis horizontal and transverse to the direction of flight, that is "pitch"). With control of the longitudinal and transverse axes, the position of the rotor of the helicopter is thus controlled or hereby stabilized. As is known, the attitude is controlled via the control of the servo drives of the swashplate of the helicopter. In the prior art, traditional methods such as the Bell-Hiller control system, paddle bars, or other like apparatus have been used to stabilize ad control the main rotor of the helicopter. Advantageously, recent developments have made it now possible to completely dispense with mechanical stabilization methods (Bell/Hiller control, so-called paddle bar) in the area of the rotor head through the use of electronically controlled swashplates.

The per se known helicopter attitude controller comprises further control inputs for control commands from a radio transmitter (RC radio remote control) which can be processed within the attitude controller and to control flight of the aircraft model. These control inputs are in formerly known helicopter flight attitude controls connected to separate, multichannel control outputs of a radio receiver (each control channel provides separate wires and an own plug). Each channel is designated a control function for the helicopter, for example, channel 1: pitch, channel 2: roll, channel 3: cyclic, channel 4: motor speed, channel 5: tail rotor control, channel 6: parameter bank switching. The assignment of the channels to the separate control functions will typically vary between RC-remote control makers or helicopter models.

A traditional remote receiver comprises usually one or more receiving antennas to receive broadcasted control channels, which are broadcasted by a remote control. The remote control usually comprises two control sticks so that for each moving direction of the stick one control channel is allocated. In the case of two sticks with a possible movement in X- and Y-direction this yields to four control channels. The conventional radio receiver typically is formed about a receiving module (high frequency part) which has beside other functions the functionality to divide the channels to at least a number of female connectors which corresponds to the number of control channels. This part of the circuit in the following is referred to receiving device.

The drawback of the above prior-art helicopter attitude controller systems is that, especially for small helicopter models, the different housings for the sensors and the radio receiver, including the numerous connecting cables from the receiver to the helicopter attitude controller housing can only be accommodated with great difficulty.

SUMMARY OF THE INVENTION

The problem solved by the present invention is to lower the amount of space consumed by, and thereby reduce the effort of arranging, known helicopter flight attitude control systems, while broadening the extension of functions, together with a improved control.

The invention relates to a model aircraft control and receiving device in a housing, comprising an electronic, gyroscopic multi-axis programmable flight attitude controller, particularly helicopter flight attitude controller, having control inputs for a plurality of control channels and inputs for gyroscope signals and further comprising a receiving device, which is fed by control channels from one or more receiver modules (e.g. satellite receiver). Therefore, the flight attitude controller provides at least one input for a receiver module. The receiver module or modules can disposed inside or outside of the housing of the flight attitude controller. The input for the receiver module or modules, or a receiving device connected to said input, processes the channels for the control of the helicopter together with possible additional channels provided by a user. At least one part of the incoming channel signals are analyzed and processed by the flight attitude controller (e.g. by a microcontroller) located inside the housing.

According to a preferred embodiment of the invention, the model aircraft control and receiving device comprises, in addition to the flight attitude control, at least one receiving module together in the same housing, whereby said receiving module receives the separate control channels together with additional, possibly further channels provided by the user (for example through a wireless connection by a radio signal). Preferably, the receiving module is arranged that way that said module can receive the control signals and that it can provide the signals to the attitude controller in encoded form. In the case of an integrated receiving module then preferably the antenna is allocated to the housing of the model aircraft control and receiving device.

The model aircraft control and receiving device comprises further at least one flight attitude controller and preferably at least one microprocessor for processing the input data. Further said device comprises one or more outputs for driving one or more mechanical control means for controlling the helicopter (e.g. RC-servos which drive the swash plate of the helicopter).

Preferably the input of the receiving device is composed by an electrical wire connection with a reduced number of single wires, whereby a plurality of control channels are combined to one or more signal lines.

More preferably, the aircraft control and receiving device comprises single, combined channel-plug, which can be used to connect said device with a receiving device for radio signal of the remote control directly. Preferably, said combined channel-plug is assigned to a data interface of the model aircraft control and receiving device. When using the combined channel-plug or the data interface it is possible to go without a plurality of inputs for separate wires which would be necessary without that feature. Advantageously, said single, combined channel-plug combines several control channels to one or more common-used control wires, for example like a wire with three veins in which preferably one wire transports a serial data signal.

The above mentioned "single-line" data interface is preferably a high speed digital link. It is possible to configure a receiving module which is connected to said link (for example a complete receiver with a receiving device and module or a satellite receiver) such that said receiving module sends the information (e.g. channel data) to the model aircraft control and receiving device or the receiving module therein in form of a sequence of digital packets. Accordingly, the model aircraft control and receiving device is preferably configured to receive the information in the form of a sequence of digital packets.

According to a first preferred embodiment the receiving module is located in a separate housing outside of the housing of the model aircraft control and receiving device, wherein said receiving module puts out the channel lines with reduced number by above mentioned data channel (satellite receiver).

According a further preferred embodiment of the invention the receiving module is integrated within the housing of the model aircraft control and receiving device. Nevertheless, in this case it is possible that the model aircraft control and receiving device provides one or more unused inputs for the connection with further receiving modules although this is not quite necessary for the operation.

Preferably, the receiving module is a 2.4 GHz-receiver which operates according frequency spread method (for example FHSS or DSSS, see Norm EN 300328). More preferably said receiving module operates according a redundant receiving principle.

The model aircraft control and receiving device and/or its housing comprises preferable a female jack or a connector for one or more satellite receivers and at least four female jacks working as control output for RC-servos.

The model aircraft control and receiving device and/or its housing further comprises preferable at least on female jack and/or a connector and/or an input for a sensor unit which can be mounted on the helicopter. Said sensor unit comprises one or more gyros, preferably the gyros are two or three-axis angular rate gyros. It is possible to compose the sensor complete or in part from separate angular rate sensor with different oriented single sensing axes.

According a further preferred embodiment of the invention the sensor or sensors, preferably the angular rate sensors, are integrated in the housing of the model aircraft control and receiving device.

The housing comprises further a female jack or a connector for a programming interface (for example a USB-interface or a serial interface) and/or a display with an input interface for programming of the device parameters.

It is possible that the model aircraft control and receiving device further comprises "classical" channel connections for the connection with conventional RC-receivers. A conventional RC-receivers comprises several channel outputs and then is connected with the model aircraft control and receiving device with one cable per each channel. Preferably the model aircraft control and receiving device does not longer comprise such "classical" channel connections. This offers at first time the important advantage that it is possible to mount the model aircraft control and receiving device in very small, light helicopter aircraft models. This advantage can be reached quite particular together with a complete integrated receiver.

Beside this, the model aircraft control and receiving device according the invention performs a method for controlling and stabilizing a model helicopter. Said method comprising providing a controller programmed with a control algorithm. The control algorithm provides control outputs to one or more control mechanisms.

Another aspect of the invention relates to a method for controlling and stabilizing a model helicopter.

The method further comprises according to a first alternative providing a learning function (automatic learning function) coupled to the control method. Preferably, one or more operator input signals (of the pilot) and one or more sensor input signals are provided to both the control algorithm and the learning function. The learning function calculates parameters and/or trim-values based upon the input signals and information from the control algorithm. The automatically determined parameters and/or trim-values are shared with the control algorithm. The control algorithm calculates output control signals from the input signals and the trim-values. The control algorithm sends the output control signals to one or more mechanisms for controlling the helicopter as well as to the automatic tuning facility. Thus, if desired by the user, the attitude controller during flight of the aircraft determines and optimizes an adjustment of trim-values and/or other parameters which are necessary for the attitude control.

The method for controlling a helicopter model comprises a controller for the swashplate and a controller for the vertical axis (vertical axis which is in yaw direction). For this purpose the method comprises a control algorithm for the swashplate and a control algorithm for the tail of the helicopter. According to an alternative the method comprises a coupling of the tail controller to the swashplate controller. For this purpose preferably one or more operator input signals and one or more sensor input signals are provided to both the swashplate controller and the tail controller. The information provided to the swashplate controller is shared with the tail controller. The information which is shared to the swashplate controller is used by the tail controller as well.

In a helicopter model, the attitude of the model in the direction of the vertical axis is usually influenced or determined by the tail rotor. Since the adjustment of the position of the tail rotor is especially difficult in helicopter models, usually a high-quality controller is used for the tail gyro system according to an integral control principle (heading hold), which is preferably integrated in the helicopter attitude controller. In a gyro system according to the integral control principle, as is well known, a control signal for the tail is processed such that the gyro holds the tail, for the most part, in the position that was set by the control signal (Elimination of the weathervane effect). Preferably, the tail controller is expanded, compared to conventional tail controllers, by additional functionality which can be provided because of the additional available signals of the helicopter attitude control compared with non-integrated tail gyro systems. This additional functionality improves the quality of the tail gyro control further. According to the herein described preferred embodiment, the device comprises a heading-hold controller for the vertical axis, which comprises a signal connection to the controller for the longitudinal and transverse axes and/or a signal connection to the control inputs, so that the heading hold controller can react earlier provide suitable control intervention to counteract movements in the direction of the vertical axis, for example, from torque fluctuations caused by control signals and/or control interventions in connection with the longitudinal and transverse axis and/or cyclical control signals. According to a preferred embodiment the tail controller comprises also a measure for reduction of sensitivity (gyro sensitivity) dependent on the velocity. This has the advantage that when the flight velocity is higher it is possible to prevent that the tail begins to oscillate.

According to an alternative embodiment of the method, the attitude controller comprises a stop support function, more precisely a method providing stop support, for a controlled portion of a remote-controlled helicopter. The method for stop support comprises providing a programmed controller for providing output signals to one or more mechanisms for controlling the portion of the helicopter (e.g. RC-servos). The controller comprises a stop support algorithm and a learn function, the stop support algorithm programmed to calculate a stop support ratio or a stopping ratio for use in deriving the output signals during a stop event. The controller is also provided with one or more operator input signals and one or more sensor input signals. Upon receipt of an operator input signal instructing a stop event in which the one or more mechanisms are instructed to stop providing input to the portion of the helicopter, the learn function is initiated to store information corresponding to the one or more operator input signals, the one or more sensor input signals, and the output signals to the one or more mechanisms. Using the programmed controller, the stop support controller calculates a series of curves defining the stop event based upon the stored information and characterizing the stop event as an overshoot, an undershoot, or an acceptable stop event. The stop support controller analyzes the stop event and determines if said stop event is undershoot or an acceptable stopping. The stop support is decreased in response to characterization of the stop event as an undershoot or increased in response to characterization of the stop event as an overshoot.

One advantage of several embodiments described in this patent application is that the helicopter attitude controller needs less space, particularly if the housing of the attitude controller has to be mounted in a small helicopter model. A further advantage is that the attitude controller has an expanded scope of functionalities compared with conventional attitude controllers, which can be achieved by an improved control. These advantages are a result of the use of an attitude controller which is connected directly to a receiver for the input signals and the combination of a plurality of single channels to one or more common uses control wires, for example by using a cable containing three wires which transfers a serial digital signal containing the channel information to the attitude controller.

The invention is not limited to the use of a special kind of remote controlled models but it is preferred to use it for remote controlled helicopter models. According a preferred embodiment the housing of the attitude controller contains a receiving module and a programmable attitude controller for more than one axis which is based on gyros. According a further preferred embodiment it is possible that the receiving module is located outside of the housing of the attitude controller. Typically the attitude controller comprises at least five input channels: Roll, pitch, collective pitch, tail rotor control and a channel for the throttle. Because of the fact that the unit with the attitude controller can be used to replace a conventional radio receiver it is possible that further channels of the satellite receiver are transferred through the unit to the outputs of the unit. At this place it should be noted that the term "satellite receiver" relates to receivers which are located outside of the actual main receiver. Therefore, the term does not relate to signals such as used by satellite for telecommunications.

Advantageously the attitude controller according the invention allows to freely allocate the channels referred to in the beginning to the different functions by the software which is contained in the attitude controller. Thus, the user is able to allocate the channels freely.

Further preferred embodiments emerge from the subclaims and the following description with reference to figures.

BRIEF DESCRIPTION OF THE DRAWINGS

FIG. 2A is a block diagram depicting a receiver and flight control unit configuration of the prior art, FIG. 2B is a block diagram depicting a receiver or receiving module and a flight attitude control according to the present invention, FIG. 2C is a block diagram depicting an exemplary manner in which data is sent via a high speed digital link, FIG. 3A is a block diagram depicting a flight attitude controller of the prior art, FIG. 3B is a block diagram depicting a flight attitude controller according to the present invention, FIG. 4A is a block diagram depicting a algorithm for control of the swashplate and the tail rotor according to the prior art, FIG. 4B is a block diagram depicting an algorithm for control of the swashplate and the tail rotor of the present invention, FIG. 7A is a graph depicting an exemplary zero crossing rate in which a driver for the helicopter overshoots a designated stopping point, FIG. 7B is a graph depicting an exemplary zero crossing rate in which a driver for the helicopter stops too early and FIG. 7C is a graph depicting an exemplary zero crossing rate in which a driver for the helicopter stops in an appropriate time.

DETAILED DESCRIPTION

Figure 1:
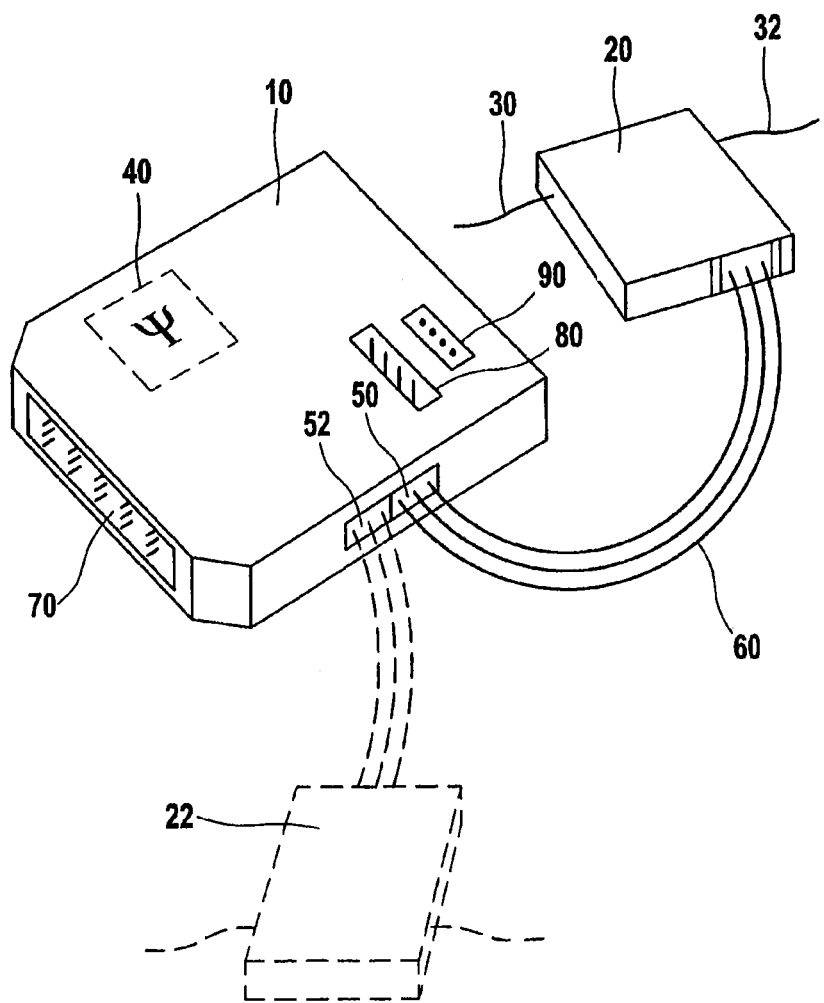
FIG. 1 is a perspective view of an helicopter flight attitude controller with a receiving device, coupled to one or more receiving module(s)

As shown in FIG. 1, the input for the receiving module is preferably formed by an electrical line connection with a reduced number of single wires, whereby a plurality of control channels are combined on one or more signal lines. FIG. 1 shows the housing 10 of the mini-helicopter attitude controller 10 connected to a 2.4 GHz DSSS satellite receiver 20 with two receiving antennas 30, 32. Although shown with a physical communication link between the controller and the receiver, in an alternate embodiment, the communication link may be a wireless connection. Housing 10 may also include a gyroscope sensor element 40. The helicopter attitude controller housing contains two or three gyro systems (angular rate sensors) arranged vertically to one another. Satellite receiver 20 can be connected to a jack 50 of the housing. Another satellite receiver 22 can be connected to another jack 52 of the housing. The signal line from the receiver 20 to the helicopter attitude controller housing 10 has a three-wire design. Housing 10 has jacks 70 for the power supply and at least 4 RC servos. Such servo drive mechanisms are commonly known in the art for use in controlling features of remote control vehicles. Jack 80 may, for example, be used to connect a portable programming device, with which the helicopter attitude controller can be programmed. Jack 90 may, for example, be a USB-port configured to receive a USB-cable, via which a personal computer may be connected for programming with a programming software and for uploading new firmware or model parameters. Moreover, the helicopter attitude controller may comprise bank switching, via which different stored sets of parameters can be polled.

FIG. 2A shows a schematic block diagram of a as such known attitude controller. The as such known conventional receiver 210 is connected to flight control unit 220 through four independent wires 212, 214, 216 and 218. Each independent wire 212, 214, 216, 218 are dedicated wires to the transmission of a singular piece of control information (channel) from the receiver 210 to the flight control unit 220. Flight control unit 220 then transfers the control signals to the individual servos 232, 234 and 236. Each servo is linked to the flight control unit via wires 222, 224 and 226 respectively.

FIG. 2B shows also as schematic block diagram for the controller of the present invention. As shown in FIG. 2B, the receiver 250 communicates with the flight control unit 260 through a single high speed digital link 252. Flight control unit 260 then transfers control signals to the individual servos 272, 274 and 276 through dedicated wires 262, 264 and 266 respectively. As shown in FIG. 2C, high speed digital link 252 is structured to send all signals from the receiver to the flight control unit as a sequence of digital packets 280, 282, 284 and. In principle, the packet structure can be of any structure. Usually, the data packets comprise a channel selector and following channel data that is being transmitted from the receiver 250 to the flight control unit 260. The use of a single high speed digital link 252 allows for a faster transmission of data, as well as additional security for data transmission. With configurations in the prior art, it is possible that any of lines 212, 214, 216 or 218 were to break or cease. In this case control of the remote-controlled model may be lost. In the case of a helicopter model this may cause into a crash. The construction of the connection combines increased robustness and reliability without adding undue cost or weight of the housing. Even more functional security may be provided by connecting two redundant receivers to the flight attitude controller which receive the same transmitted signal. In such an embodiment, if one of the receivers or one of the communication links between the receiver and the controller malfunctions or is terminated, the second receiver may keep receiving input and transmitting the data to the controller, thereby possibly averting a crash of the aircraft. As depicted, servos 272, 274 and 276 are operated as simple on/off switches (at RC-servos common pulse-width modulation). Servos 272, 274 and 276 are mechanically connected to the swash plate of the helicopter model so that said swashplate can be moved.

According to a first exemplary embodiment of the present invention, the receiving means is arranged in a separate housing outside the housing of the flight attitude controller. The housing of the flight attitude controller is connected with a reduced number of cable lines to the satellite receiver. In a second exemplary embodiment of the present invention, the receiving means may be integrated with the attitude control in the housing. Integration of the receiver 20 into the housing 10 may allow for quicker processing time and reduced space on the remote-controlled helicopter. This is particularly important for mounting the attitude controller in small helicopters models.

The receiving means 20 in one preferred embodiment of the present invention may be a 2.4-GHz receiver, which operates according to the frequency spread method (for example, FHSS or DSSS, as outlined by the Norm ETSI (ETSI=European Telecommunications Standards Institute) EN 300328, Harmonized European Market Standard (Telecommunications Series), for example working according a redundant receiving principle, whereby the receivers use so-called "diversity"—antennas or a plurality of antennas. Suitable receiving means are for example as such known commercial available Spectrum receivers produced by comp. Horizon Hobby (Champaign, Ill., USA) or the Duplex receiver of comp. Jeti model, Příbor, Czech Republic, or Futaba S-Bus receivers, which are available at comp. robbe Modellsport Beteiligungs GmbH, Germany for example.

The controller housing 10 preferably comprises at least one jack or one interface for one or two or more satellite receivers as well as at least four jacks for RC servos. These four jacks correspond to the three outputs for the swashplate control and an additional output for the tail control. Furthermore, the housing comprises a jack or interface for a gyro unit for an especially biaxial or tri-axial angular rate sensor, whereby the sensor may also be formed from uni-axial sensors with different orientations, and/or the angular rate sensors are integrated in the housing of the helicopter attitude controller. This gyro jack may be separate from the other jacks or it may be integrated with the other jacks, depending on the design of controller 10. Furthermore, the housing preferably comprises a jack or port for a programming interface (for example, USB interface or serial interface) and/or a display (not shown in Fig.) with input interface for programming the apparatus parameters.

According to a further preferred embodiment of the present invention, the helicopter attitude controller comprises a self-learning function, typically residing as an algorithm expressed as a set of instructions programmed into a Microprocessor or -controller or hardware or some combination thereof, which independently determines or further optimizes an adjustment of trim values necessary for the attitude control and/or other set parameters necessary for the attitude control during flight. As shown in FIG. 3A, which reflects the prior art, the control algorithm receives inputs from the receiver and sensors 310. This input may be relayed back to the operator of the remote-controlled helicopter. The operator then may supplies manual tuning input using a not shown controller received from the inputs from the receivers and sensors 310 as well his or her personal experience and knowledge. This manual tuning input 320 is processed by control algorithm 300, which also factors in the inputs from the receiver and sensors 310.

The control algorithm then provides output commands 330 to the servos to control the controllable features of the helicopter.

In the present invention, as shown in FIG. 3B, the control algorithm 350 is paired with the automatic tuning facility 360. The automatic tuning facility 360 provides the algorithm with the ability to more quickly determine and adjust the parameters of the control loop. In one embodiment of the present invention, the inputs from the receiver and sensors 370 are sent to both control algorithm 350 and automatic tuning facility 360. Automatic tuning facility 360 receives the operator input acquired from the receiver, as well as any measurements from the sensors, and calculates any automatic tuning 380 parameters. This automatic tuning parameters 380 are then sent to the control algorithm, and the control algorithm outputs the various control signals to the servos 390. This output of the control algorithm may also be sent to the automatic tuning facility 360 to provide the automatic tuning facility 360 with as much input as possible.

The automatic tuning facility 360 may monitor several internal and external signals and derive tuning changes from the history of the monitored signals. Therefore, the reaction of the complete system is optimized over the course of the operation. The automatic tuning facility 306 may evaluate and tune any control variable, but preferably only feed forward (forward coupling), the proportional gain and the integral gain and the zero offsets (also referred to as the trim value), the pre-compensation intensity (including the torque and dynamic effects), and the adaptation time for the adaptive control algorithm. Automatic tuning facility 360 may monitor other values as needed. The automatic tuning facility 360 may constantly tune the remote-controlled helicopter, or the automatic tuning facility may be turned off by the user to prevent overtuning of the helicopter.

FIGS. 4A and 4B further show, how the control and stabilization of the remote-controlled helicopter differs from the state of the art. In typical control schemes, inputs from the receiver and sensors 402 are sent to a microprocessor which contains a swashplate control algorithm 400. The programmed swashplate control algorithm then processes these inputs, as well as any manual tuning input, and sends the output to the swashplate servos 404. Similarly, the input from the receivers and tail sensors 412 are input to a processor programmed with a tail algorithm 410 and, when combined with manual tuning input, the tail algorithm 410 sends the output to the tail servo 414. Typical prior art swashplate algorithms 400 operate separately and independently from tail algorithms 410.

According one embodiment of the present invention, however, the above described separation will be eliminated. In this embodiment, as illustrated in FIG. 4B, swashplate algorithm 450 and tail algorithm 460 are in constant communication with one another. As shown in the block diagram, the present invention allows the swashplate algorithm 450 to communicate with the tail algorithm 460, thereby sharing data from the inputs from the receiver and sensors 452 as well as the tail sensor 462. The swashplate algorithm and the tail algorithm therefore exchange information preferably at least velocity of the helicopter (airspeed), torque needed, torque change, yaw rate and tail thrust. By exchanging these values, the two algorithms may work in tandem to better stabilize the helicopter as well as provide better overall control of the movements of the helicopter. For instance according one example the swashplate algorithm 450 may now not only receive the original input from the receiver and the sensors, but also input received from the tail sensor 462 as well as any output actions being sent by tail algorithm 460 to the tail servo 464. Similarly, the tail algorithm may now receive all the information from all the receivers and sensors, as well as any actions that might be outputted by the swashplate algorithm 450 to the swashplate servos 454. This feature allows the helicopter to process information faster for creation of greater stability for the helicopter. Furthermore it allows for better control and better responsiveness to the control.

According to another embodiment, the helicopter attitude controller also comprises an additional control of the vertical axis (vertical axis in the yaw direction). In a helicopter model the orientation in the direction of the vertical axis is controlled or influenced by the tail rotor. Due to the fact that the control of the orientation in a helicopter may be difficult, commonly high-quality controllers where used within the gyro- or gyroscopic-system, said controller work according an as such known integral principle (heading hold, heading lock) which processes a control signal for the tail so that the gyro holds the tail in the position which is predetermined by the control signal. This prevents or softens the so-called "wind vane effect" which from experience happens if the tail of the helicopter is treated by side wind. According an embodiment the tail controller is expanded by a functionality which has, compared with conventional tail controllers the opportunity for exchanging information with the control or controllers which relate to the tail (see FIG. 4b). According to this exemplary embodiment, to allow the additional functionality, the swashplate algorithm communicates directly with the tail algorithm. Said communication is possible in a system without a tail gyro which is integrated in a flight attitude control because the signals in the flight attitude controller are additional available. Said communications improves the quality of the tail control system by the additional functionality. For this, according a preferred embodiment the helicopter flight attitude controller comprises a heading-hold controller for the vertical axis which has a signal connection to the controller for the longitudinal and transversal axis and/or a signal connection to the control inputs so that the heading-hold controller can produce output signals depending on the control inputs which operate against movements along the vertical axis earlier, whereby especially for example control interventions which are from variations of torque, control signals and/or control interventions in the direction of the longitudinal or transversal axis and/or cyclic control interventions where compensated.

Figure 5:
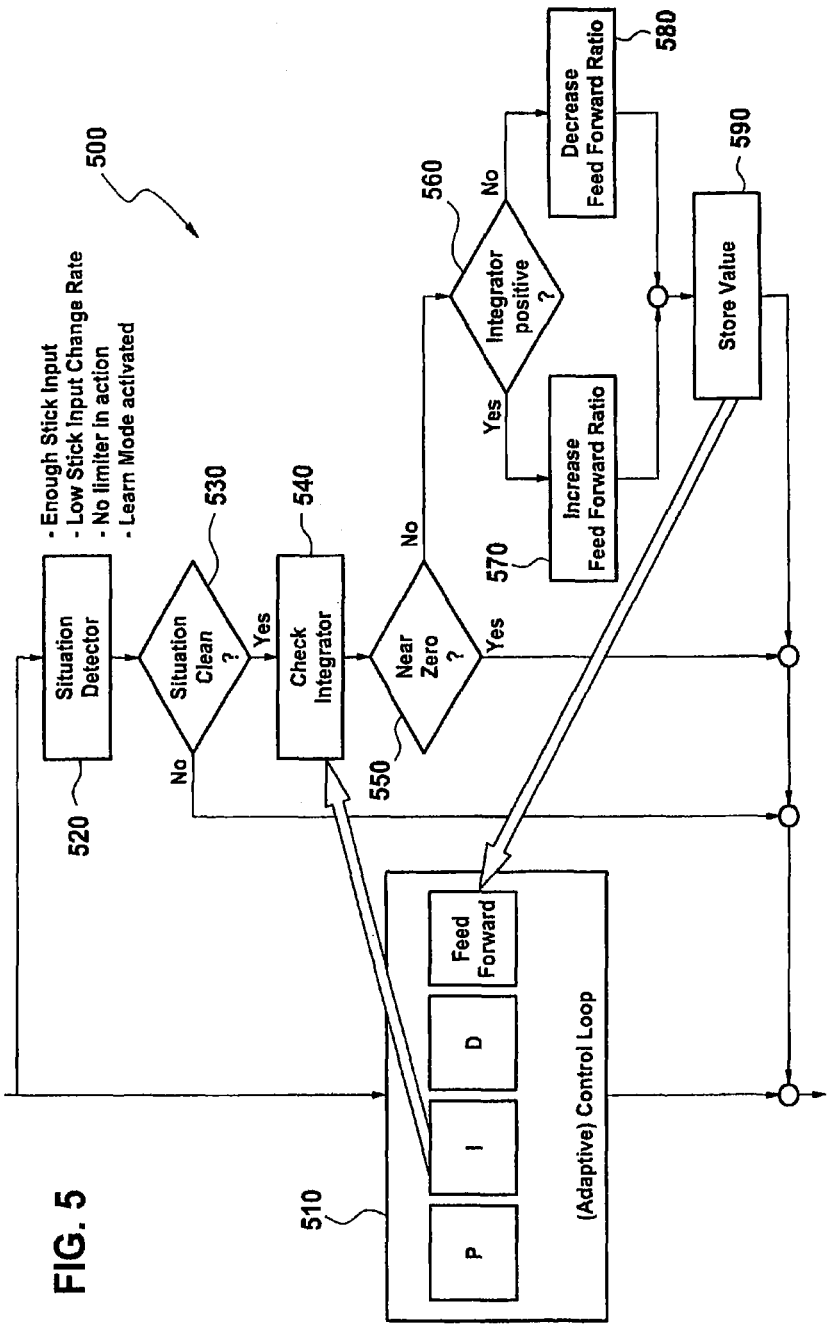
FIG. 5 is a block diagram depicting an exemplary adaptive control loop comprising an exemplary algorithm for controlling the "Feed Forward"-value and the self learning function.

As discussed above, the present invention may contain an adaptive control loop that is capable of making adjustments to the swashplate servos and tail servo to assist in stabilizing the remote-controlled helicopter. An exemplary embodiment of the self-learning software is shown is shown in FIG. 5. In FIG. 5, block 500 illustrates an exemplary programmed algorithm to adjust the forward feed (pre-control). The algorithm starts at step 510 with adaptive control loop 510. The adaptive control loop 510 first assesses status in a situation detector step 520. The algorithm is programmed to determine the status of the remote-controlled helicopter system, looking at such factors as whether there is enough stick input, whether there is a sufficient stick movement (stick input), weather there is a sufficient velocity of the stick movement (stick change rate), whether there is no limiter in action, whether the self-learning mode has been switched on or off, or any other influencing values are fulfilled. Once the algorithm determines the status, it proceeds to step 530 to determine if the situation is "clean." The system is considered "clean" when there is no change in input from the user. Thus, if the user has not modified his input, the situation is determined to be clean and the algorithm continues to step 540. If the situation is not clean, because the user has modified his or her input, the loop will return to the adaptive control loop 510 and the program will reinitiate the analysis. Once the algorithm moves to step 530, the program will then check the integrator at step 540. If the integrator for the value being analyzed is near zero at step 550, the program will once again reinitiate back to the adaptive control loop. The determination if the value is in the range of zero may be determined by the user and preprogrammed into the software as default values. These default values may be set by the helicopter manufacturer. If, however, the integrator is determined to not be near zero (step 550), the algorithm then progresses to step 560 and determines if the integrator value is positive or negative. If the integrator value is positive, the program will move to step 570 and increase the forward feed. If the integrator value is negative, the program will move to step 580 and decrease the forward feed. This new forward feed will then be stored at step 590 in the adaptive control loop. By storing the value at step 590, the adaptive control loop will be able to compare future sensor readings and user inputs to the stored forward feed and thereby make adjustments for the remote-controlled helicopter quicker and more accurately.

Figure 6:
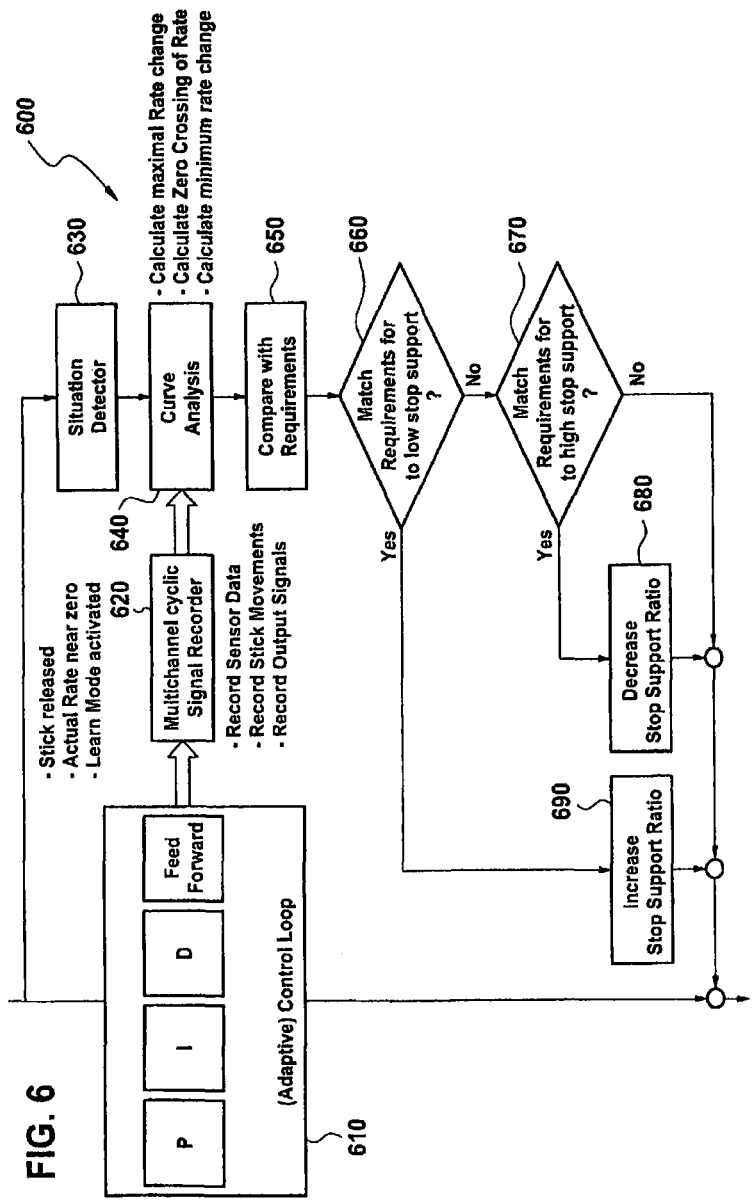
FIG. 6 is a block diagram depicting an adaptive control loop comprising an exemplary algorithm for controlling and stabilizing the rate of change of the direction of a remote-controlled helicopter, further illustrating an exemplary automatic learning function.

As FIG. 6 shows, is a block diagram depicting an adaptive control loop illustrating an exemplary algorithm 600 utilized to help stop one or more drivers controlling a portion of a remote-controlled helicopter. When a user is satisfied with the user inputs made to some aspect of the remote-controlled helicopter system, the user typically releases the control stick corresponding to such inputs come to rest its origin position. In this case, the sticks are in a condition were is no control input because there is no user manipulation of the stick. This stick position defines a stop event which is assisted by exemplary algorithm 600, which provides a stop support ratio. Additionally, Algorithm 600 assist stopping any changes in input to the system. With the stop support it is possible to predetermine a feed-forward instruction curve to the relevant set of controllers, as derived from the control input in combination with the output of the control loop. The curve is shaped to eliminate overshoot or undershoot when the relevant portion of the system is instructed to stop providing input. The intensity of the signal may be adjusted depending on environmental influences, such as dampening factors of the rotor system, airfoils of the blades etc. Adjusting this intensity is a purpose of algorithm 600. When the user is providing a command to the helicopter using the control stick, algorithm 600 is inactive. Algorithm 600 initiates at step 630 by activating the learn mode when the user releases the remote control stick, signaling a desire that the associated drivers controlled by the stick should stop providing input to the system. Initiation of the algorithm causes transmission of all data in step 620 to the multi-channel cyclical signal recorder. Sensor data collected by all of the sensors attached to the controller, stick movements input by the user, and output signals that are eventually output to the various servos for maneuvering the remote-controlled helicopter are stored. The algorithm uses this information to determine if value is above or below (overshoot/undershoot), and to generate the control curve to handle a similar stop the next time the controller is faced with similar input information from the user and the sensors, allowing the program to provide more accurate output to the servos more quickly to provide stoppage at the desired rate.

As shown in FIG. 6, the exemplary algorithm calls for an evaluation of system status at step 630. The algorithm checks data indicating whether the control stick is released, whether the actual rate is near zero, and whether the learn mode is activated. When the prerequisite conditions are met, the algorithm advances to step 640 and performs a curve analysis. To perform the curve analysis, the program calculates the maximum rate change, the zero crossing of the rate, and the minimum rate change from the input provided by the sensors, as further discussed below. The algorithm then moves to step 650 where the calculated maximum rate change, the zero crossing of the rate and the minimum rate change are compared with the requirements for the helicopter. When the algorithm compares these values, it determines at step 660 whether the calculated values match the requirements for low stop support. If so, the algorithm skips to step 690 and increases the stop support ratio. If the calculated values do not match the requirements for low stop support, the program proceeds to step 670 and determines whether the calculated values match the requirements for high stop support. If the calculated values match the requirements for high stop support, the algorithm decreases the stop support ratio at step 680. If the calculated values do not meet the requirements for high stop support or low stop support, no changes are made to the stop support ratio. The requirements for the stop support ratio may be preprogrammed by the manufacturer of the remote-controlled helicopter, or the requirements may be programmed into the adaptive control loop by the user.

FIGS. 7A-7C show an exemplary set of curves that may be produced at step 640 of the above algorithm. The curve analysis step calculates two values from the trace of the most recent stop attempt: 1) the first zero crossing of the rate signal after stick release; and 2) the first direction change of the rate signal after the stick release.

In FIGS. 7A and 7B, the first zero crossing of the rate signal after stick release is marked as 710. Similarly, the first direction change of the rate signal after the stick release is marked as 720.

FIG. 7A shows a representative graph of the curve analysis for a curve that shows a stop with a value above the boundary (overshooting). If no stop support is given, the attempted stop curve for the drive may resemble this graph, which depicts the rate of the drive slowing down but failing to stop at the zero rate. Rather the drive overshoots the stop position and requires the control loop to correct in the opposite direction. Relying on the control loop to correct overshooting takes a much longer time than is possible with the use of an algorithm such as shown in 600. If this is situation occurs, as determined by the algorithm in steps 640 and 650, the stop support ratio is increased at step 690, so that next time the stoppage is accelerated in response to user input signaling a stop event.

Conversely, FIG. 7B depicts a situation in which too much stop support is provided and the stop is to early (undershooting). In this case the rate change direction occurs before the zero crossing, meaning that the control loop had to provide additional corrective signals to achieve the desired result. Just like when the helicopter overshoots the stop position, correcting undershooting through the use of only the control loop is much slower than correcting undershooting using an algorithm such as shown in 600. This situation calls for the stop support ratio to be decreased at step 680.

Finally, FIG. 7C shows an adequate stop in which both the rate direction change and the zero cross occur at precisely the same time, as assisted with the above-described algorithm.

Referring to the FIGS. 4 to 6, in addition to the examples described above further values can be calculated or optimized by a self-learning algorithm, such values may for example airspeed adapted to the gain of the tail algorithm, changes in torque calculated as output to the tail actuator (also known as the dynamic torque compensation); yaw rate calculation and rotation of the coordinate system of the swashplate algorithm (also known as pirouette optimization); and tail thrust value calculation and output to the swashplate to compensate for any resulting effects on the cyclic axes.

Even though above examples of the invention relate to remote-controlled helicopters and/or -models, the invention is not limited to such models.

The invention claimed is:

1. A model helicopter control and receiving device for controlling a model helicopter wherein the model helicopter comprises at least a tail, a tail rotor for controlling yaw of the model helicopter, a main rotor, and a swashplate for controlling the main rotor to control both pitch and roll of the model helicopter, the device comprising:
a housing disposed within a fuselage of the model helicopter;
at least one RC receiver module disposed inside said housing and configured to receive a plurality of control signals including one or more swashplate control signals carried on a plurality of control channels, including a plurality of user input instruction signals comprising information corresponding to a plurality of user input instructions, each instruction designated to instruct one of a plurality of mechanisms for controlling at least one aspect of the remote controlled model helicopter, the at least one RC receiver module comprising at least one output;

an electronic, gyroscopic multi-axis programmable flight attitude controller disposed inside said housing, having:
- at least one input for receiving the at least one RC receiver module output comprising said plurality of control channels,
- a plurality of inputs for receiving a plurality of gyroscope signals comprising at least one tail sensor signal and one or more swashplate sensor signals,
- a processor capable of processing said plurality of control channel signals and said at least one tail sensor and one or more swashplate sensor gyroscope signals, said processor programmed with one or more control algorithms for generating output instructions, comprising a tail control algorithm coupled to a swashplate control algorithm for controlling flight of the model helicopter, wherein the swashplate control algorithm and the tail control algorithm share the one or more swashplate control signals and at least said at least one tail sensor and one or more swashplate sensor gyroscopic signals, model helicopter velocity, yaw rate and tail thrust information; and
- an electrical line connecting said at least one RC receiver module output to said at least one input on said controller for receiving said output, said electrical line comprising one signal line, said electrical line configured to combine said plurality of control channels on the one signal line.

2. The model helicopter control and receiving device of claim 1, wherein said at least one RC receiver module is a 2.4 GHz receiver that operates according to a frequency spread method with a redundant receiving principle.

3. The model helicopter control and receiving device of claim 1, wherein said housing comprises at least one connector or port for the at least one RC receiver module and at least four ports for RC-Servos.

4. The model helicopter control and receiving device of claim 1, further comprising a gyroscope unit having one or more biaxial or tri-axial angular rate sensors, wherein said housing comprises a connector or a port for the gyroscope unit, the plurality of inputs for gyroscope signals are connected to the gyroscope unit for receiving information from the one or more biaxial or tri-axial angular rate sensors, and the electronic, gyroscopic multi-axis programmable flight attitude controller is configured to utilize gyroscope signals from said gyroscope unit to generate control signals for controlling flight of the model helicopter.

5. The model helicopter control and receiving device of claim 4, wherein the one or more biaxial or tri-axial angular rate sensors are integrated in the housing.

6. The model helicopter control and receiving device of claim 1, further comprising a display with an input interface for programming parameters for the model helicopter control and receiving device, and said housing comprises a connector or a port for said input interface.

7. The model helicopter control and receiving device of claim 1, wherein the electronic, gyroscopic multi-axis programmable flight attitude controller is programmed with a self-learning function adapted to determine or optimize one or more adjustment parameters for flight attitude control, autonomously during flight of the model helicopter.

8. The model helicopter control and receiving device of claim 7, wherein trim value is one of the adjustment parameters.

9. The model helicopter control and receiving device of claim 1, wherein said electronic, gyroscopic multi-axis programmable flight attitude controller comprises a heading-hold control for a vertical axis of the model helicopter which comprises a signal connection to a control or a control input for a longitudinal axis of the model helicopter and a transverse axis of the model helicopter, the heading-hold control adapted to provide control outputs responsive to one or more of: torque variations, control signals provided by a model helicopter operator, and automatic control signals related to one or more of: the model helicopter longitudinal axis, the model helicopter transverse axis, and cyclic control.

10. The model helicopter control and receiving device of claim 1, wherein the electronic, gyroscopic multi-axis programmable flight attitude controller further comprises a self-learning function.

11. The model helicopter control and receiving device of claim 1, wherein the electronic, gyroscopic multi-axis programmable flight attitude controller further comprises a stopping support function.

12. A method of controlling and stabilizing a model helicopter, using the model helicopter control and receiving device of claim 1, comprising the steps of:
- receiving one or more signals in the electronic, gyroscopic multi-axis programmable flight attitude controller from at least one of the plurality of control inputs and said at least one tail sensor and one or more swashplate sensor gyroscope signals; and
- controlling the model helicopter with the electronic, gyroscopic multi-axis programmable flight attitude controller in response to said one or more control signals, including controlling the tail of the model helicopter with the tail control algorithm using information shared with the swashplate control algorithm.

13. The method of claim 12, wherein the electronic, gyroscopic multi-axis programmable flight attitude controller further comprises a stopping support function, the method further comprising implementing the stopping support function to assist in stopping the model helicopter.

14. The method of claim 12, further comprising transmitting at least the plurality of control signals on a single wire as a serial data signal.

15. The model helicopter control and receiving device of claim 1, wherein the plurality of control channels are configured to carry a plurality of different control signal types.

* * * * *

UNITED STATES PATENT AND TRADEMARK OFFICE
CERTIFICATE OF CORRECTION

| | | |
|---|---|---|
| PATENT NO. | : 9,041,519 B2 | Page 1 of 1 |
| APPLICATION NO. | : 13/147475 | |
| DATED | : May 26, 2015 | |
| INVENTOR(S) | : Ulrich Röhr | |

It is certified that error appears in the above-identified patent and that said Letters Patent is hereby corrected as shown below:

On the Title Page, page 2, ITEM [56], References Cited:

OTHER PUBLICATIONS

D. J. WALKER, "Multivariable control of the longitudinal and lateral dynamics of a fly-by-wire helicopter," Control Engineering Practice, Vol. 1,, Issue 7, pp. 781-795 (Jul. 2003).

should read:

--D. J. WALKER, "Multivariable control of the longitudinal and lateral dynamics of a fly-by-wire helicopter," Control Engineering Practice, Vol. 11, Issue 7, pp. 781-795 (Jul. 2003).--

Signed and Sealed this
Twenty-seventh Day of October, 2015

Michelle K. Lee
*Director of the United States Patent and Trademark Office*